A. R. CHRISTIAN.
TROLLEY POLE.
APPLICATION FILED JULY 8, 1910.
1,083,266.
Patented Dec. 30, 1913.
4 SHEETS—SHEET 1.
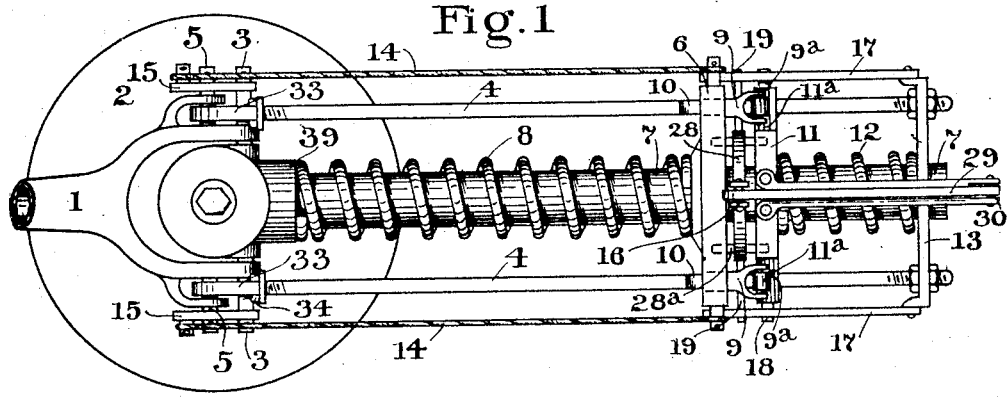
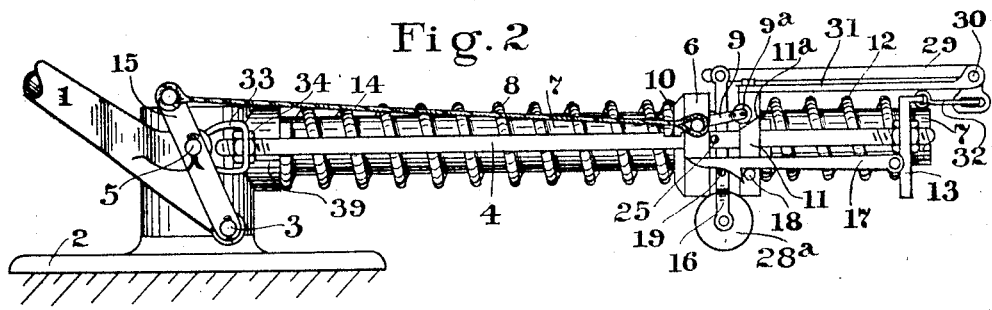
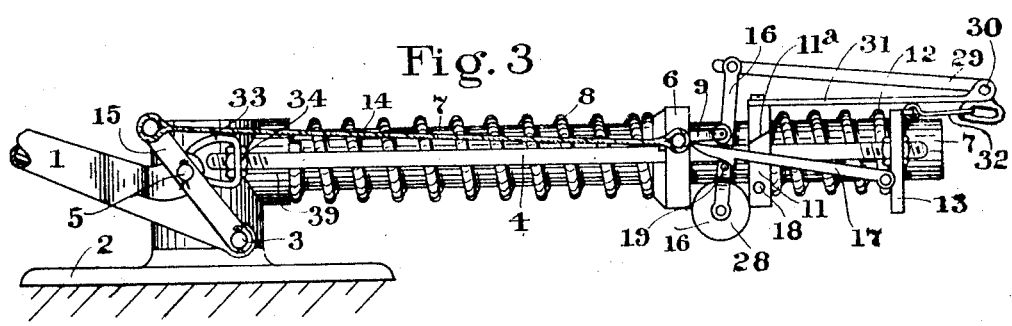
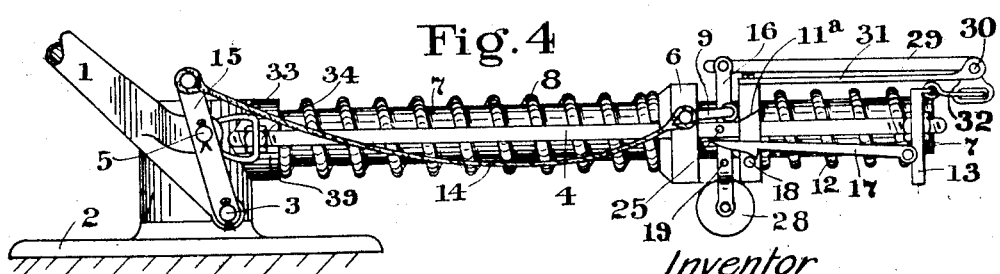
Witnesses
Inventor
Arthur R. Christian.

A. R. CHRISTIAN.
TROLLEY POLE.
APPLICATION FILED JULY 8, 1910.

1,083,266.

Patented Dec. 30, 1913.
4 SHEETS—SHEET 2.

Witnesses

Inventor
Arthur R. Christian

A. R. CHRISTIAN.
TROLLEY POLE.
APPLICATION FILED JULY 8, 1910.

1,083,266.

Patented Dec. 30, 1913.
4 SHEETS—SHEET 3.

Witnesses

Inventor
Arthur R. Christian.

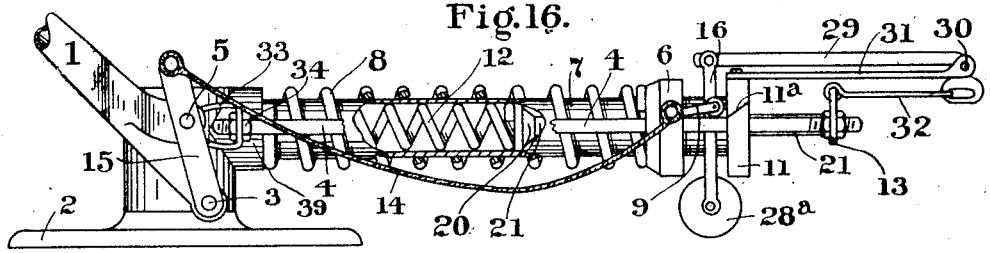
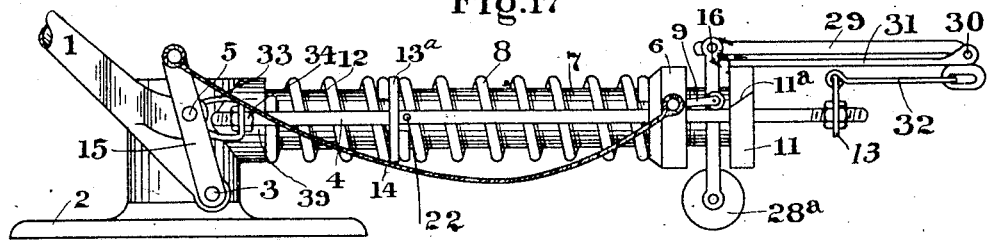
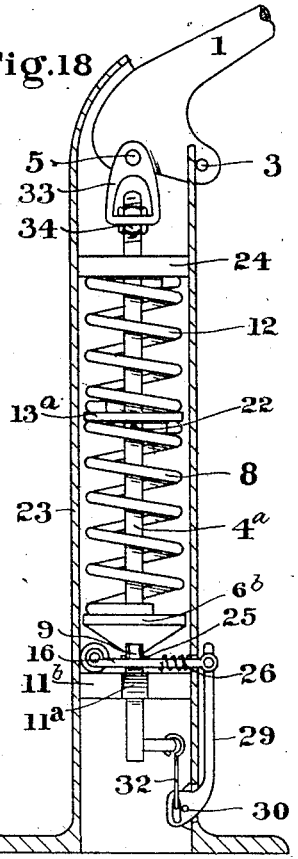
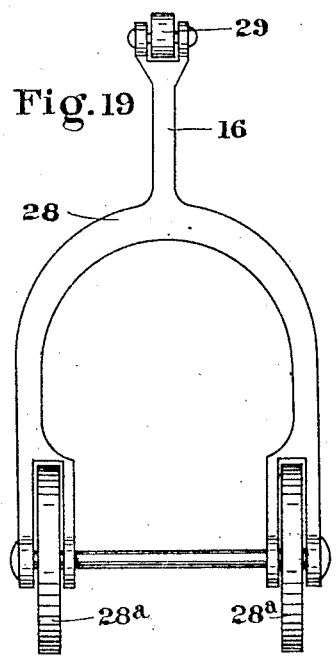

UNITED STATES PATENT OFFICE.

ARTHUR RICHMOND CHRISTIAN, OF CHRISTCHURCH, NEW ZEALAND.

TROLLEY-POLE.

1,083,266.  Specification of Letters Patent.  Patented Dec. 30, 1913.

Application filed July 8, 1910. Serial No. 570,931.

*To all whom it may concern:*

Be it known that I, ARTHUR RICHMOND CHRISTIAN, a subject of the King of Great Britain, and residing at 179 Hereford street, in the city of Christchurch, in the Province of Canterbury and Dominion of New Zealand, have invented new and useful Improvements in and Relating to Trolley-Poles, of which the following is a specification.

This invention relates to trolley poles such as are used in electric traction systems to engage with and conduct the current from the overhead wire to the car.

In trolley poles at present in use, the construction comprises a pole hinged at or near its lower extremity to a suitable base or pillar according to the type of pole or system employed, the said pole being maintained upwardly at an angle of approximately 45°, so as to place its trolley in contact with the wire, by means of a helical spring or springs acting in compression. In trolley poles of this description there is a serious danger of the trolley, should it accidentally disengage the wire, fouling some portion of the overhead gear of the permanent way, as, owing to the absence of the downward pressure exerted upon the trolley by the wire, the spring carries the pole upward and maintains it in this condition until it is again replaced by hand.

The object of the present invention is therefore to provide means whereby this momentary upward movement will cause the compression of the spring or springs to be sufficiently relaxed to allow the pole to fall back again by reason of its own weight to a point below the wire where it will be in no danger of coming in contact with any of the overhead gear and means are also provided whereby the pole may be simply and expeditiously replaced with its trolley wheel in contact with the wire.

In order that my invention may be fully understood, reference will now be made to the accompanying drawings in which:—

Figure 5:
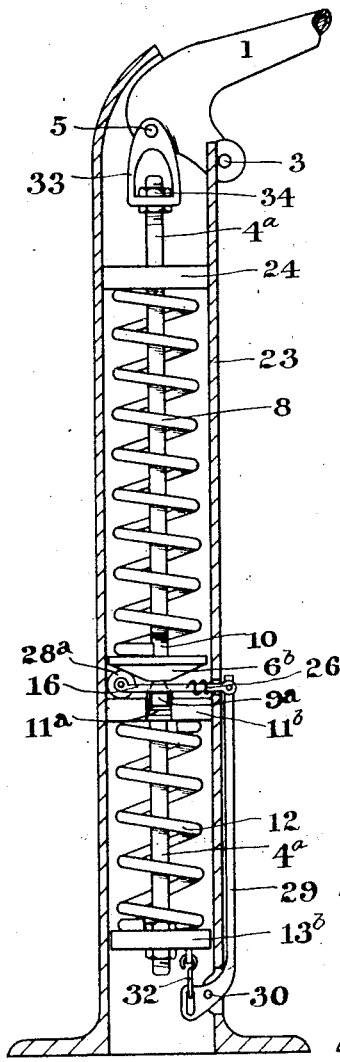
Figure 6:
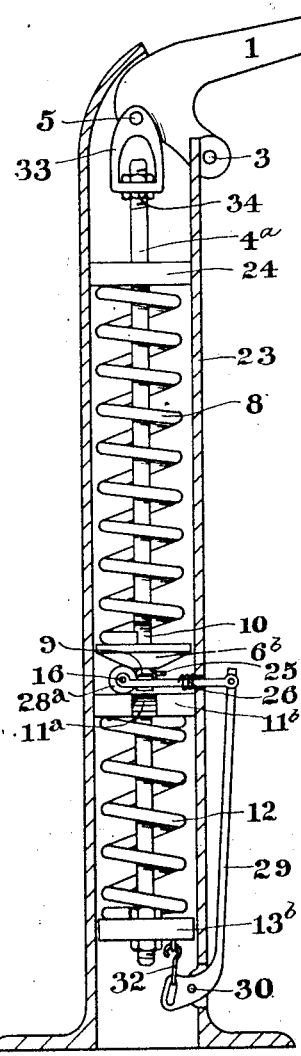
Figure 7:
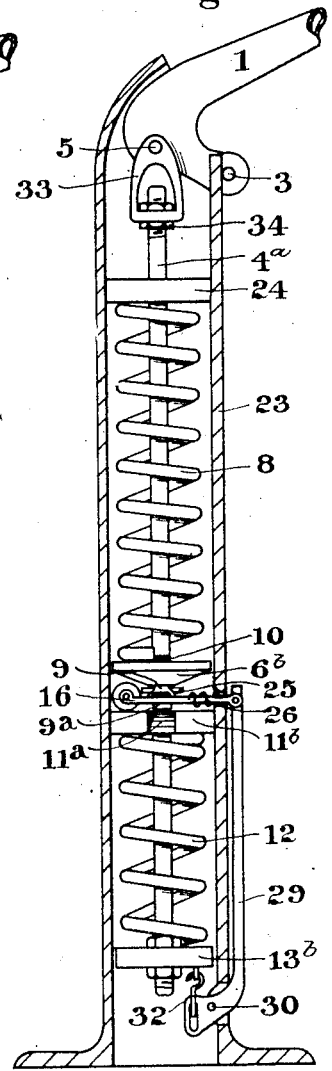
Figure 8:
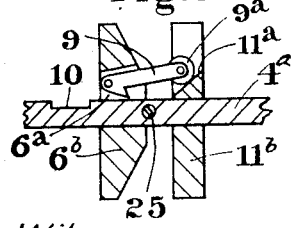
Figure 14:
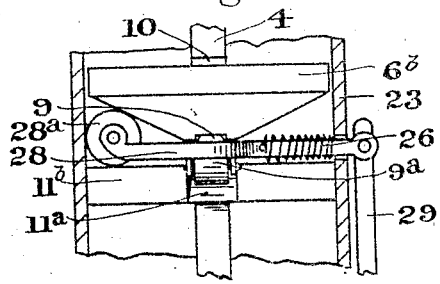
Figure 15:
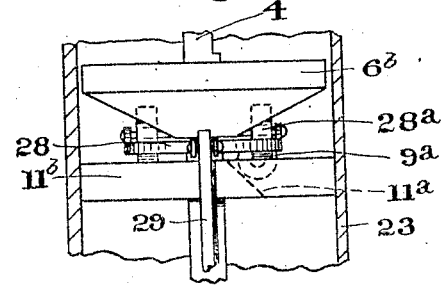

Figure 1 is a plan view of the pole of that type in which the spring is arranged horizontally, showing the invention applied, the pole (which is broken away for convenience) being in the lowered position. Fig. 2 is a side elevation of the same, Fig. 3 is a similar view of the pole in process of being replaced, Fig. 4 is also a similar view showing the pole in the running position, Fig. 5 is a side elevation of a pole of that type in which the spring is arranged vertically, showing the pole in the released condition, Fig. 6 is a similar view showing the pole in process of being replaced upon the wire, Fig. 7 is a similar view showing the pole in the running position, Fig. 8 is a sectional view of a portion of the connecting rod and the slidable and fixed bridges showing the pawl in the position which it assumes when the pole is in the condition shown in Figs. 1, 2, 5 and 11, Fig. 9 is also a similar view showing the position which the pawl assumes when the pole is as shown in Figs. 3, 6 and 12, Fig. 10 is also a similar view showing the pawl in the position it would assume when the pole is as shown in Figs. 4, 7, 13, 16, 17 and 18, Fig. 11 is a side elevation of a similar type of pole to that shown in Figs. 5, 6 and 7, but with the buffer spring arranged within the main spring, the pole being in the released condition, Fig. 12 is a similar view showing the pole in process of being replaced upon the wire, Fig. 13 is also a similar view showing the pole in the running position, Figs. 14 and 15 are respectively side and rear elevations of a portion of the device showing the arrangement of the retarding device and the slidable and fixed bridges, Fig. 16 is a side elevation of a pole of the horizontally arranged spring type, showing the pole in the running position a portion of the main spring and the core thereof being broken away in order to show the buffer spring which is arranged therein, Fig. 17 is a side elevation of a similar type of pole to that shown in Fig. 16, the buffer spring in this case however being a detached portion of the main spring, Fig. 18 shows this arrangement of the buffer spring applied to the pillar type of pole, and Fig. 19 is a detail view of the retarder.

Referring to Figs. 1, 2, 3 and 4 which illustrate the invention as applied to one common type of trolley pole comprising a pole portion 1 hinged at or near its lower end to a base 2 by means of a pin 3, the pole being maintained in the upward position, with the trolley in contact with the wire, by means of connecting rods 4 which are attached by pins 5 arranged at a suitable point above the pin 3, so as to give sufficient leverage to control the pole, the necessary pull being exerted upon the rods 4 by means of the bridge 6 which is attached thereto and which is adapted to slide upon a suitable core 7, provided upon the base 2. Upon the core 7 is threaded a helical spring 8 so that the latter may be compressed between the said bridge 6 and an abutment 39 provided upon the base 3 at the point where it joins the core 7.

Figure 9:
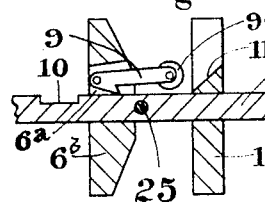
Figure 10:
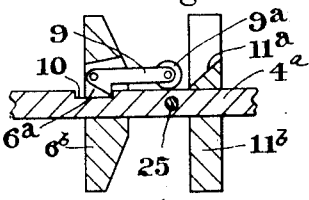

Instead of securing the bridge 6 permanently to the rods 4 as is customary, in this invention the bridge is made slidable upon the rods and maintained in the required position when the trolley is in contact with the wire by pawls 9, arranged within the holes 6ª, in the bridge 6, through which the rods pass. The pawls 9 are pivoted at their forward ends as shown in Figs. 8, 9 and 10 and are adapted to engage with the notches 10, formed in the upper sides of the rods 4, in which position they maintain the pole upward in the ordinary manner so long as the trolley remains in contact with the wire. Should however the trolley leave the wire, the pole, being freed from the downward pressure of such wire upon the trolley, will be carried upward by the spring 8 which action manifestly necessitates a backward movement of the rods 4 and bridge 6. Arranged behind the bridge 6 is another bridge 11 which is secured to the core 7 and is provided, at points in line with the pawls 9, with inclined surfaces or cams 11ª, which, when the bridge 6 moves back in the manner described, engage with the rear ends of such pawls, which project beyond the rear of the bridge 6, and thus lift the pawls a sufficient distance to cause them to disengage the notches 10 and so allow the rods to slide through the bridge 6 and release the spring and permit the pole to fall by means of its own weight. The pole is arrested, when it has dropped a sufficient distance to insure its clearing all overhead gear, by means of the compression of the buffer spring 12 between the bridge 11 and the bridge 13, attached to the end of the rods 4 and slidably arranged upon the core 7.

In order to reduce the friction between the cams 11ª and the ends of the pawls 9, the latter may be provided with rollers 9ª. The pole will now be in the condition illustrated in Figs. 1 and 2 and in order to restore it to the running position again, with the trolley in contact with the wire, the pole is drawn downward by hand until it assumes the position shown in Fig. 3. This action causes the flexible connections 14, which are here shown attached to the pole by means of the arms 15, to draw the bridge 6, to which they are attached, forward, away from the fixed bridge 11 thus freeing the pawls from the cams 11ª and allowing them to fall into position ready to engage the notches 10 again, while at the same time the distance piece or retarder 16 to be afterward explained is drawn up into the space now left vacant between the bridges 6 and 11, as shown in Fig. 3. The pole is now released and is thrown upward by the action of the spring 8, which was partly compressed by the action of drawing the pole down, and also by the compression of the buffer spring 12, which upward movement of the pole carries the rods 4 backward. The bridge 6 however, when attempting to run back also, comes in contact with and is momentarily arrested by the retarder 16, which has not had time to fall clear of the bridges. The rods 4 therefore slide through the holes in the bridge 6 sufficiently far to enable the pawls to engage the notches 10 and thus place the spring in compression again, while the retarder falls clear of the bridges by means of its own weight and so the pole is restored to the running position as shown in Fig. 4.

With a pole of this type, in order to guard against the pole rebounding after it has been lowered into the position shown in Figs. 1 and 2, owing to the sudden compression of the buffer spring, a locking device may be employed to secure the bridge 13 to the fixed bridge 11, such locking device comprising a bar 17 hingeably secured to the bridge 13, at its rear end, while its forward end is provided with a hook adapted to engage a suitable pin or projection 18 upon the bridge 11, when the pole is in the condition shown in Figs. 1 and 2, while a pin or lug 19 is provided upon the retarder 16, which, as the latter is raised in the action of replacing the pole in the working position, will come in contact with and so lift the hook clear of the pin 18, as clearly shown in Fig. 3.

The buffer spring it will be noted, in addition to discharging its function in obviating the shock when the pole is lowered, also assists the main spring in supporting the pole when the latter is in the working position and the general arrangement of this buffer spring may be varied to suit requirements without in any way interfering with its usefulness for both purposes. For instance, in the arrangement shown in Fig. 16, the buffer spring is placed within the core 7, in which case it is compressed between a fixed stop at the forward end of the core and a plunger 20 which is connected by means of a rod 21 to the bridge 13. Again in the form shown in Figs. 17 and 18 the buffer spring 12 constitutes a portion of the main spring 8 from which it is separated by the bridge 13ª, which, instead of being secured to the ends of the rods 4 as is the bridge 13, is slidably mounted thereon so that, as long as the pole remains in the working position. the bridge 13ª does not come into action but merely slides upon the rods and the core as required. When however, the pole is released the stops 22, placed upon the rods 4, behind the bridge 13ª, come in contact with such bridge 13ª and thus as the rods continue their forward movement, in the action of lowering the pole, they cause the bridge 13ª to compress the spring 12 and obviate the jar in a similar manner to that already described.

In Figs. 5, 6, 7, 11, 12 and 13, the invention is shown applied to that type of pole in which the spring 8 is arranged vertically within a hollow pillar 23, in which case the core 7 is dispensed with and its position is occupied by the single connecting rod 4ª, the bore of the tube acting as the guide for the spring 8 and the slidable bridges 6ᵇ and 13ᵇ. A bridge 24, having a hole to permit of the rod 4 sliding through it, is secured near the upper end of the bore of the pillar, being employed in place of the abutment 39 to effect the compression of the spring 8. The pin 3 upon which the pole is hinged is in this case secured to the upper end of the pillar 23, and the pin 5 by means of which the connecting rod 4 is attached to the pole, is placed thereon a sufficient distance inward from the pin 3 to give the rod the required amount of leverage to control the pole as before described. In this type of pole, the bridge 6ᵇ obtains its hold upon the rod 4ª by means of a pawl 9, attached to the bridge 6ᵇ and engaging with the notch 10, in the rod 4ª, all arranged and acting in a similar manner to that already described, while the bridge 11ᵇ provided with the cam 11ª is secured in the bore of the pillar beneath the bridge 6ᵇ so that when the trolley disengages the wire, the pawl will be caused to release the rod from the bridge 6ᵇ and allow the pole to fall until arrested by the compression of the buffer spring 12 between the fixed bridge 11ᵇ and the slidable bridge 13ᵇ secured to the rod 4ª in the manner previously described in connection with the other type of pole.

The pole when in the released condition, as shown in Fig. 5 is replaced in engagement with the wire in the same manner as previously described by drawing the pole down still farther by hand. Owing to the lack of space within the pillar however, the flexible connections 14, which are used in the horizontal arrangement for drawing the bridge 6 away from the bridge 11, are dispensed with and in order to effect this object, a pin or other suitable stop 25 is placed upon the rod 4ª, at the required point beneath the bridge 6ᵇ, so that as the rod 4ª rises when the pole is drawn down in the process of replacing, such stop 25 will come in contact with and so carry the bridge 6ᵇ upward away from the bridge 11ᵇ, in a similar manner and for the purpose previously explained. The same arrangement may be applied to the horizontal type of pole by placing a stop 25, in rear of the bridge 6, as shown in Figs. 2, 3 and 4, in which case the connections 14 would not be necessary, but as it will be seen that the connections are secured to the pole at a point where greater leverage is obtained they will impart to the bridge 6 the required amount of movement without having to draw the pole down so far as would be necessary where the stops are employed, and for this reason therefore it is considered advisable to use the connections where the construction permits.

It will be noted from Figs. 6 and 7 that the retarder 16 in this case acts in precisely the same manner as that in the other form of pole, a spring 26 however, adapted to be compressed when the device is drawn into place between the bridges, is employed in place of gravity, as in the other type, to carry the retarder out of action after the pawl has engaged the notch. In order to give sufficient space to accommodate the retarder when out of action, the under side of the bridge 6ᵇ is here shown beveled.

Figure 11:
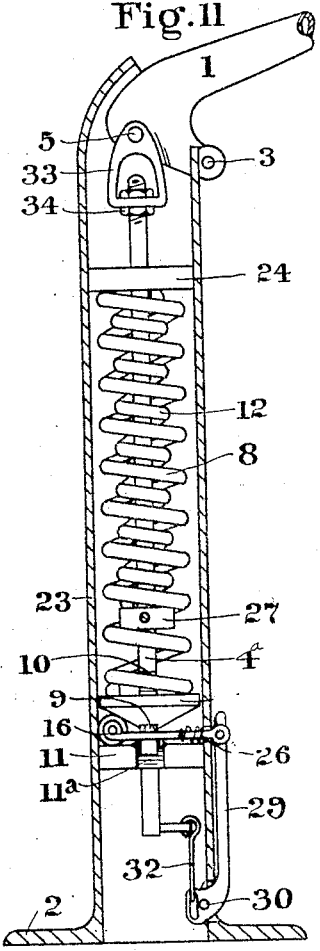
Figure 12:
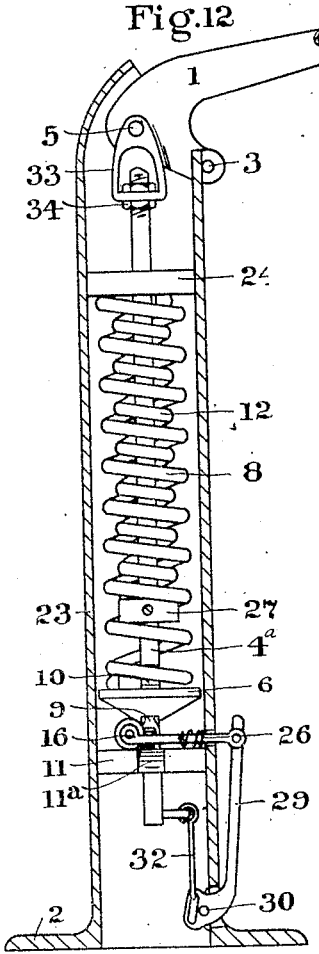
Figure 13:
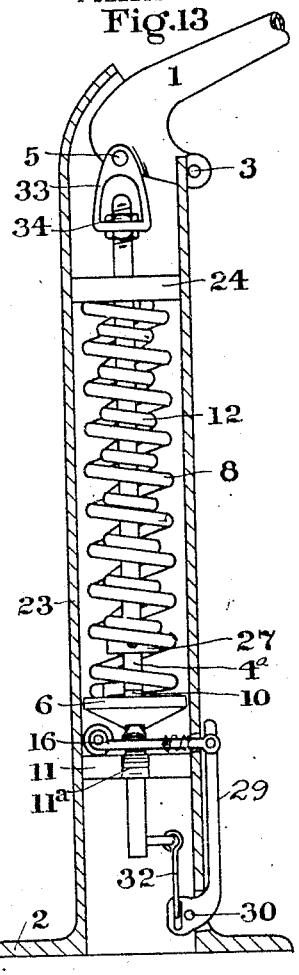

The arrangement shown in Figs. 11, 12 and 13, differs from that of Figs. 5, 6 and 7, in that the buffer spring 12 is situated within the spring 8, the compression of such buffer spring being effected between the bridge 24 and a collar or stop 27, placed at the required point upon the rod 4ª.

In the form illustrated in Fig. 18, the arrangement is also similar to that of the others of the pillar type except that the buffer spring 12 is a portion of the spring 8 and separated therefrom by the bridge 13ª, arranged and operating in a manner exactly similar to that described in connection with Fig. 17.

The form and operation of the retarder 16 is substantially the same for all types of pole and, according to the drawings, comprises an arched or forked member 28 having, revolubly mounted thereon, near the extremities of its two branches, rollers or wheels 28ª, of such diameter that, when drawn between the bridges 6 and 11 or 6ᵇ and 11ᵇ in the manner described, they will serve to bridge or nearly bridge the gap between them. The top of the arched member 28 is hingeably secured to the extremity of the long arm of the bell-crank-lever 29 which is fulcrumed upon the pin 30, secured either to the pillar 23 or else to the member 31, which projects from the bridge 11 or any other convenient fixed point. The other arm of the lever 29 which is made shorter than the before mentioned arm, in order to magnify the movement of the rods 4 sufficiently to operate the retarder in the required manner, is connected, by means of the link 32, either to the end of the rod 4 or some other convenient member which is adapted to move therewith, such as for instance the bridge 13 in Figs. 1, 2, 3 and 4. The end of the arm is slotted in order to allow the link 32 to travel back with the rod 4 without carrying the retarder out of action when the pole is being replaced.

In all types of pole it is thought advisable to provide means for adjusting the length of the rods 4 or 4ᵃ and according to the drawings this is effected by connecting the rod to the pole by means of the link member 33, which is secured, at its upper or forward end, to the pole by means of the pin 5, while the end of the rod passes through a hole in its rear or lower end where it is secured by means of the lock nuts 34.

In the foregoing, the invention is described as applied to two of the most commonly used forms of pole but it must be clearly understood that its application is not limited thereto and in any case where the pole is maintained upward by means of compression springs, the adaptation of the device for the purpose hereinbefore explained must be understood to come within the scope of the invention.

I claim:

1. In trolley poles of the class described, the combination with a trolley pole of a spring adapted to hold the pole elevated in contact with the trolley wire, rods having notches therein connected to said pole, a bridge slidably mounted on said rods, pawls carried by the bridge engaging the notches of said rods whereby the spring is maintained in compression, means for automatically relaxing the spring when the pole disengages the wire, comprising a stationary bridge arranged in the rear of said slidable bridge and provided with means for disengaging the pawls from the notches when such slidable bridge is caused to approach the stationary bridge, and means for arresting the pole when it has fallen to a point clear of the overhead gear, comprising a second bridge controlled by said rods and a buffer spring adapted to be compressed between the stationary bridge and said second bridge.

2. In trolley poles of the class described, the combination with a trolley pole of a spring adapted to hold the pole elevated in contact with the trolley wire, rods having notches therein connected to said pole, a bridge slidably mounted on said rods, pawls carried by the bridge engaging the notches of said rods whereby the spring is maintained in compression, means for automatically relaxing the spring when the pole disengages the wire, comprising a stationary bridge arranged in the rear of said slidable bridge and provided with means for disengaging the pawls from the notches when such slidable bridge is caused to approach the stationary bridge, and means whereby the compression of the controlling spring may be restored after the pole has fallen, comprising tension members connecting the pole and sliding bridge whereby the sliding bridge will be drawn forwardly on the drawing down of the pole below its fallen position, and means for retaining the sliding bridge in a forward position until the rods carry the notches therein back into engagement with the pawls, substantially as described.

In witness whereof I have hereunto set my hand in the presence of two witnesses.

ARTHUR RICHMOND CHRISTIAN.

Witnesses:
 PERCY R. CLIMIE,
 CYRIL C. COATES.